United States Patent
Yoo et al.

(10) Patent No.: US 6,738,559 B1
(45) Date of Patent: May 18, 2004

(54) FEATURE-DEPENDENT OPERATING METHOD BETWEEN TWO CONNECTED EQUIPMENTS AND AN APPARATUS FOR CONTROLLING THE OPERATING METHOD

(75) Inventors: Jea-Yong Yoo, Seoul (KR); Kang-Soo Seo, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 867 days.

(21) Appl. No.: 09/606,004

(22) Filed: Jun. 29, 2000

(30) Foreign Application Priority Data

Jun. 29, 1999 (KR) ......................................... 1999-25494
Mar. 20, 2000 (KR) ......................................... 2000-14121

(51) Int. Cl.⁷ .............................. H04N 5/91; H04N 5/85
(52) U.S. Cl. ......................................... 386/46; 386/125
(58) Field of Search .......................... 386/46, 124, 125, 386/126, 45, 105, 106, 83, 92, 1, 40, 52, 4, 66, 55, 95, 96, 98; 348/555, 556; H04N 5/91, 5/85

(56) References Cited

U.S. PATENT DOCUMENTS 5,977,964 A * 11/1999 Williams et al. ............ 345/721
2002/0057893 A1 * 5/2002 Wood et al. ................. 386/46

* cited by examiner

*Primary Examiner*—Robert Chevalier
(74) *Attorney, Agent, or Firm*—Birch, Stewart, Kolasch & Birch, LLP

(57) ABSTRACT

The present invention relates to a method and apparatus for accomplishing a requested operation selectively based upon features of other equipment between equippments connected through a digital interface such as the IEEE 1394. The feature-dependent operating apparatus consists of a connector sending and receiving data through the digital interface; a memory storing feature information of a connected equipment received through the connector; a pickup detecting video and/or audio data from a data storage medium; a controller controlling the pickup to detect data from the data storage medium based on the stored feature information, converting the format of the detected data into a format specified in the stored feature information, and generating an advisory message informing a mismatch between the format of data to offer and the format specified in the feature information; and a data sender transmitting data detected by the pickup or the generated message to the connected equipment through the digital interface. This feature-dependent operating apparatus is able to adjust functions and processing capacity of a equipment to the maximal or universal capacity of the connected equipment automatically, or to inform a viewer of the cause of possible malfunction if the features of the connected equipment are not same, when data by a requested operation are to be transmitted to the connected equipment, thereby improving the convenience of a viewer.

19 Claims, 8 Drawing Sheets

Conventional Art

FEATURE-DEPENDENT OPERATING METHOD BETWEEN TWO CONNECTED EQUIPMENTS AND AN APPARATUS FOR CONTROLLING THE OPERATING METHOD

BACKGROUND OF THE INVENTION

1. Field of the Invention

The present invention relates to a method for accomplishing a requested operation selectively based upon features of other equipment connected through a digital communication line.

2. Description of the Related Art

FIG. 1 shows an example of several electric home appliances connected each other through a digital interface line such as the IEEE 1394. The electric home appliances connected each other are a digital versatile disk (DVD) player 100 for reproducing high-quality digital video and/or audio data from an optical disk, a digital video cassette recorder (VCR) 300 for recording/reproducing high-quality digital video and audio data to/from a magnetic recording medium such as a digital video tape, a set top box (STB) 400 for receiving RF broadcast signals, extracting data streams of a selected program from the broadcast signals, and transmitting them to an appropriate equipment, a digital TV 200 for presenting the high-quality video pictures and sounds after decoding received data from a digital satellite broadcast, the DVD player 100, or the digital VCR 300, and a digital audio equipment 500 for outputting high-quality sounds after decoding received digital audio data streams.

The DVD player 100 connected through the IEEE 1394 standard uses a DVD as a medium.

The DVD recording medium will be popularized as a multi-functional disk recording medium since the standard for a DVD recording medium has been rapidly developed among related companies. Therefore, the DVD player will be widely used, and a digital video/audio presenting equipment capable of providing high-quality video pictures and sounds, for example, a digital TV will be also popularized in the near future.

Accordingly, a method using a DVD player or a DVD recorder in connection with a digital TV as shown FIG. 1 is expected to be rapidly increased. The connection standard between electric home appliances such as a DVD recorder, a digital TV, and so on is sure to be IEEE 1394.

The DVD player 100 processes digital data stream of MPEG format, especially a program stream (referred as 'PS' hereinafter) differently depending upon whether the data stream contains a presentation data or a navigation data. The presentation data is processed to yield video and audio, and the navigation data is used for controlling data reproducing operation of a DVD player.

Contrary to the DVD player 100, the digital TV 200 processes digital data streams of MPEG format organized with transport streams (referred as 'TS' hereinafter) into presentation data, and converts them into video and audio signals. Accordingly, the DVD player 100 should convert PS into TS before transmission, or the digital TV 200 should convert received PS into TS before signal processing.

The difference between PS and TS is as follows.

The PS consists of several packs and each pack consists of packetized elementary stream (PES) packets containing digitized video, audio, and additional information data. A PES packet can contain data whose size is variable so that the size of a PES packet may not be same all the time.

On the contrary, the TS consists of transport packets and each packet has a fixed length of 188 bytes including its packet header.

Accordingly, when converting PS into TS, each PES packet of PS should be divided into packets of TS sequentially and necessary header information is added to each divided TS packet at that time. Because a PES packet is divided into multiple TS packets, remaining area of the last TS packet is stuffed with null data after writing all data of a PES packet in the multiple TS packets.

The digital TV 200 can output high-quality video pictures and sounds by decoding the digital data streams transmitted from the DVD player 100 through the above format-converting process.

The operation such as a disk reproduction of the DVD player 100 can be controlled remotely through the digital TV 200 connected via the IEEE 1394 standard, or directly through key commands on a front panel or a remote controller.

The DVD, a multi-functional disk, can include several titles in a single disk, and characteristics of contents such as picture resolution, the number of audio channels, and display mode (for example, 4:3, 16:9, Pan-scan, or letter box) may be different according to each title. Therefore, additional information to indicate title characteristics is recorded in a DVD. In addition, a copy-right information, a disk type information on single-sided or double-sided, and various information for providing new functions are recorded in a DVD. This means that the DVD has different characteristics if a contained title is different.

Accordingly, new functions are embodied and new hardware elements are added in a recently developed DVD player in order that reproduction methods or data processing method adequate to the title characteristics and the additional information may be executed without operation fail.

However, the digital TV 200 connected to the DVD player 100 through a digital interface such as the IEEE 1394 standard may not equip a processing capacity corresponding to the data processing capacity and the operation features of the DVD player 100, and may not support the characteristics of contents of the DVD in which aforementioned additional information and data for new functions are recorded.

Moreover, a low-price digital TV may not have information on its processing capacity and operational features, or may not support the negotiating function for mutual exchange of the feature information. In these case, the digital TV cannot process video/audio data of various characteristics provided by the DVD player 100 appropriately.

Accordingly, the video and audio data normally reproduced from a DVD by the DVD player may be presented abnormally in the digital TV.

SUMMARY OF THE INVENTION

It is an object of the present invention to provide a feature-dependent operating method between mutually-connected equippments and an apparatus for controlling the operating method, which request an external equipment such as a digital television to send its feature information, determine whether the data to provide for the external equipment are normally processed based on the feature information, if it is received through a digital interface, and perform a requested mutual operation selectively depending upon the result of the determination, or perform the requested mutual operation according to the pre-specified proper method if the requested feature information is not received.

The feature-dependent operating method according to the present invention comprises the steps of requesting feature information of a connected equipment through a digital interface; receiving the requested feature information through the digital interface and storing the received feature information; and performing a requested operation or not based on the stored feature information.

The feature-dependent operating apparatus according to the present invention comprises a connecting means sending and receiving data through a digital interface; a storing means storing feature information of a connected equipment received through said connecting means; a data acquisition means obtaining video and/or audio data from a data storage medium; a controlling means controlling said data acquisition means to or not to obtain data from the data storage medium based on the stored feature information; and a transmitting means transmitting data obtained by said data acquisition means to the connected equipment through the digital interface.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings:

FIG. 2 is block diagrams of a DVD player and a digital television which the feature-dependent operating method between equippments connected each other through a digital interface is applied to;

FIG. 3 is a reproduction flow diagram of a DVD player which a feature-dependent operating method according to the present invention is applied to;

FIG. 5 is a reproduction flow diagram of a DVD player which another feature-dependent operating method according to the present invention is applied to;

FIG. 7 is a reproduction flow diagram of a DVD player which another feature-dependent operating method according to the present invention is applied to;

DETAILED DESCRIPTION OF THE PREFERRED EMBODIMENT

In order that the invention may be fully understood, preferred embodiments thereof will now be described with reference to the accompanying drawings.

Figure 1:
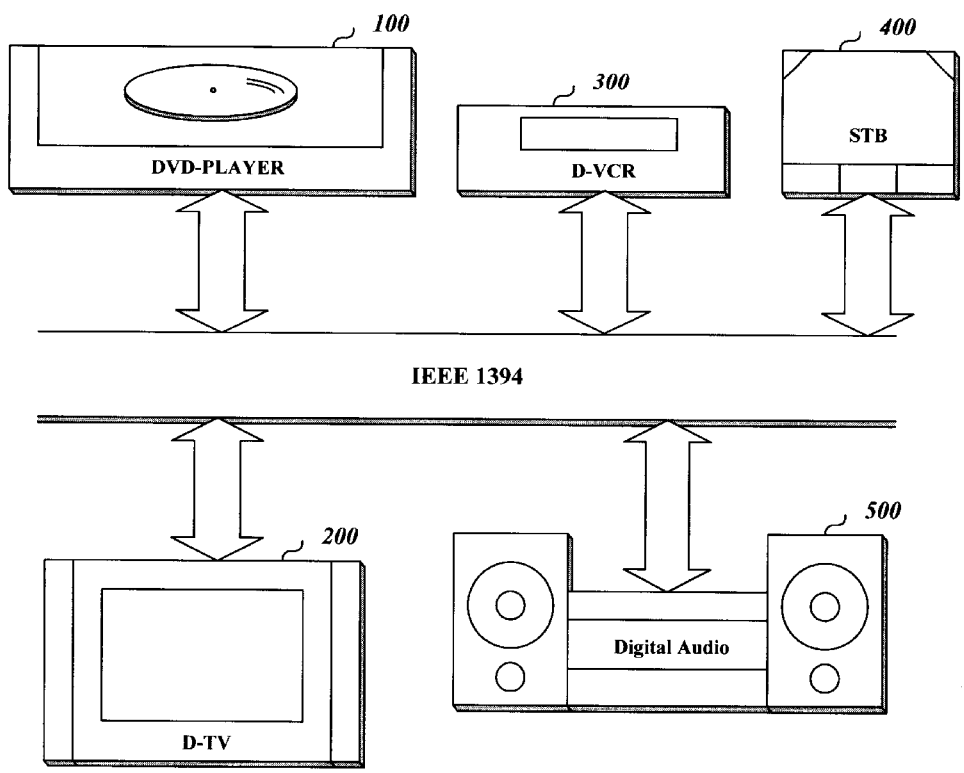
FIG. 1 shows an example of several electric home appliances connected each other through a digital interface such as the IEEE 1394.
Figure 2:
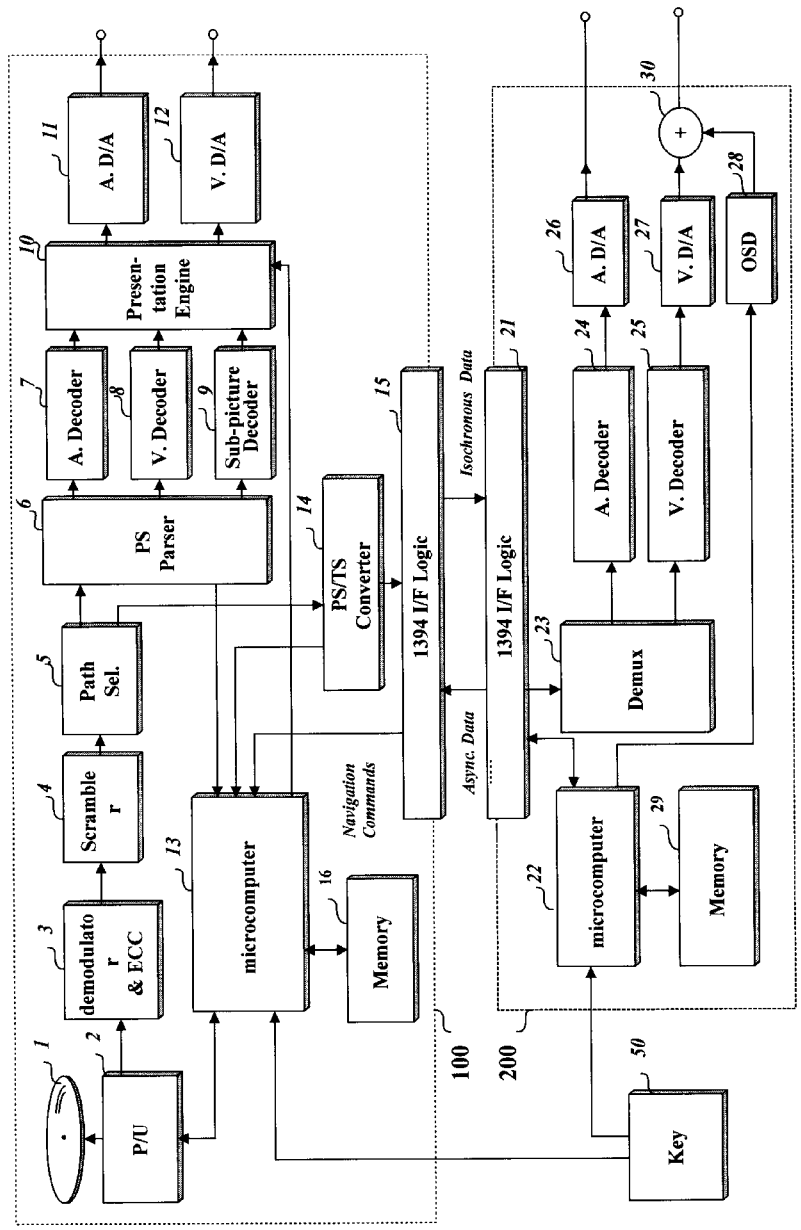

FIG. 2 is block diagrams of a DVD player and a digital TV which the feature-dependent operating method between equippments connected each other through a digital interface is applied to. The DVD player 100 comprises an optical pickup 2 for detecting data recorded in a DVD 1; a demodulator 3 for demodulating and error-correcting the detected data; a scrambler 4 (or a copy protecting equipment) for scrambling data outputted from the demodulator 3 with copy protecting codes; a path selector 5 for selecting one or two output path for data scrambled with the copy protecting codes; a data parser 6 for parsing data streams, that is, PS received through the path selector 5 into presentation and navigation data and then parsing the presentation data into audio, video and sub-picture data again; decoders 7, 8, and 9 for decoding the parsed audio, video and sub-picture data into uncompressed data respectively; a presentation engine 10 for combining the decoded audio, video and sub-picture data into digital audio signal and video signal; D/A converters 11 and 12 for converting the digital audio and digital video into corresponding analog signals respectively; a microcomputer 13 for controlling reproduction operation for the DVD 1 depending upon the navigation data from the data parser 6 and feature information received from the digital television 200, or providing advising messages automatically or on a user's request; a memory 16 for storing data necessary for control operation of the microcomputer 13 and the feature information of the digital TV 200; a PS/TS converter 14 for converting the PS outputted from the path selector 5 into TS; and an interface 15 for transmitting the converted TS through a IEEE 1394 digital communication line.

The digital TV 200 comprises an interface 21 for receiving TS from the DVD player 100 through the IEEE 1394 digital communication line; a demux 23 for demuxing the received TS into audio and video data; decoders 24 and 25 for decoding the audio and video data into uncompressed audio and video data respectively; D/A converters 26 and 27 for converting the uncompressed digital data into corresponding analog audio and video signals respectively; a microcomputer 22 for generating control signals for each element corresponding to a user's key input, reading self feature information requested from the DVD player 100, and transmitting the read feature information; an on-screen display (OSD) circuitry 28 for outputting character signals corresponding to the advisory message transmitted from the DVD player 100 onto a screen; a mixer 30 for mixing the character signals with the decode video signals; and a memory 29 for storing feature information and data necessary for control operation of the microcomputer 22.

A key entering means 50 such as a remote controller for controlling operation of the DVD player 100 and the D-TV 200 is also shown in FIG. 2.

And, the PS/TS converter 14 of the DVD player 100 may be integrated into the digital TV 200, or may be designed as a stand-alone.

The inter-operation between the DVD player 100 and the digital TV 200 which are constructed as shown in FIG. 2 will now be described in detail.

In the DVD player 100, recorded signals detected from the DVD 1 by the optical pickup 2 are demodulated into PS by the demodulator 3. The PS is separated into audio, video and sub-picture data of MPEG format by the data parser 6, and the MPEG-formatted data are converted into audio and video signals by the decoders 7, 8, and 9, the presentation engine 10, and the D/A converters 11 and 12. Also, the PS is sent to the PS/TS converter 14 through the path selector 5. The PS/TS converter 14 decodes the PS and interprets the stream identification number, sorts out the PS into program specific information (PSI) for controlling program presentation, presentation data containing audio and video data, and system clock data.

The program specific information and system clock data are used as information for controlling presentation of program and system clock synchronization, respectively.

The presentation data are converted into TSs whose format is acceptable to the digital TV 200 and transferred to the digital TV 200 through the IEEE 1394 interfaces 15 and 21. Accordingly, the digital TV 200 can present high-quality digital video and audio to a viewer after decoding the data contents packetized into the received TSs, if the format of data contents is suitable to decoding requirements of the digital TV 200.

Now, a feature-dependent operation is explained. If a user presses a play key on the key entering means 50 for a certain title of the DVD 1 inserted in the DVD player 100 to be reproduced, the microcomputer 13 of the DVD player 100 checks feature information of the digital TV 200 which has been stored in the memory 16. The DVD player 100 receives the feature information in advance from the digital TV 200 through the interface unit 21 and stores it in the memory 16. The DVD player 100 judges on whether data streams which are to be reproduced and transmitted by the requested playback can be displayed normally in the digital TV 200 after understanding the processing capacity and operational function of the digital TV 200 based on the stored feature information. If the reproduced data streams are to be processed normally in the digital TV 200, the DVD player 100 carries out the requested playback operation, and if not, it carries out the requested operation differently.

Embodiments of this operation will now be described in detail with reference to the accompanying drawing.

Figure 3:
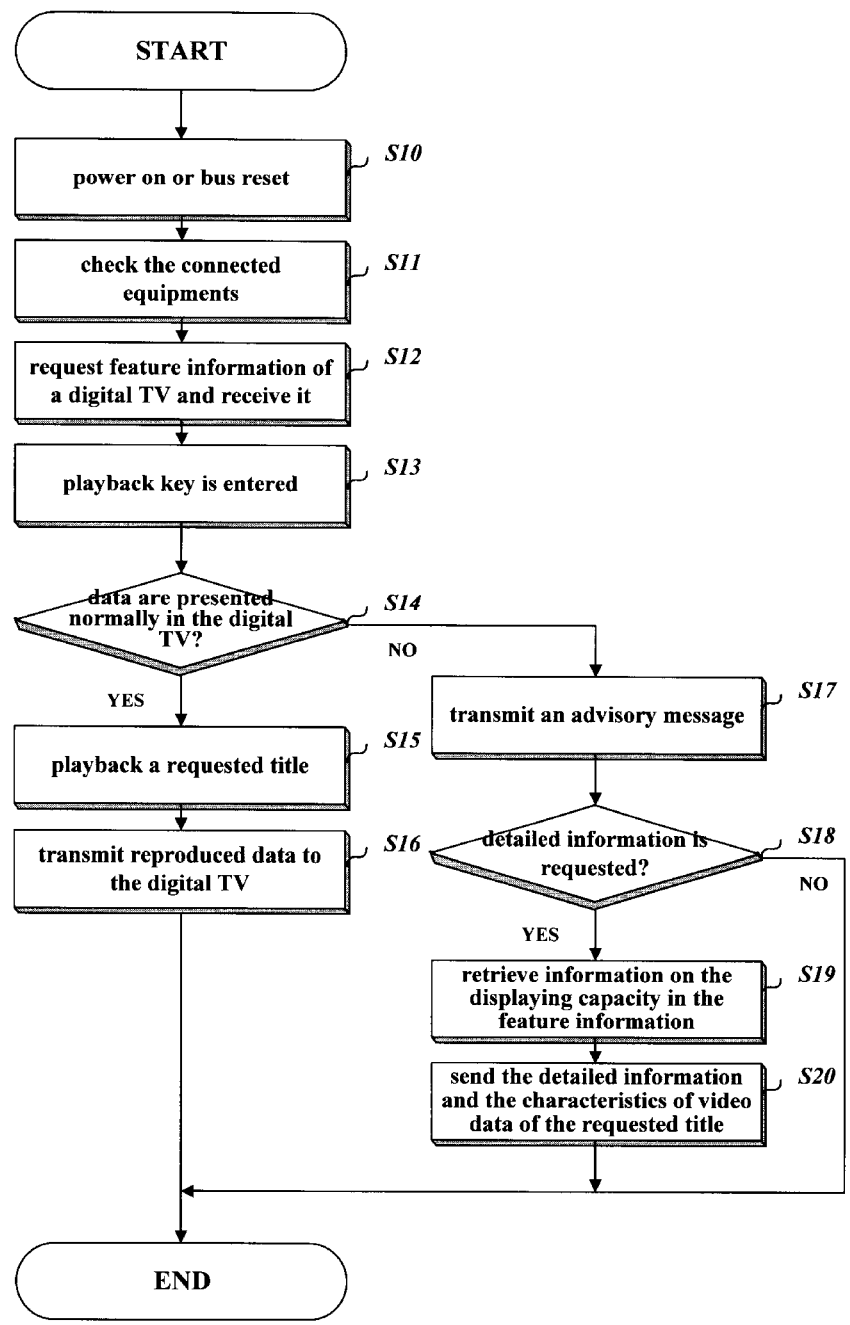

FIG. 3 is a playback flow diagram of the DVD player 100 which a feature-dependent operating method according to the present invention is applied to. When a power source of the DVD player 100 is turned on or a reset is occurred (S10) on the digital interface bus of the IEEE 1394, the microcomputer 13 checks (S11) the connection status of the connected equippments including the digital TV 200 through the IEEE 1394 interface bus. If the digital TV 200 is connected, the DVD player 100 requests feature information of the digital TV 200 and then receives it from the digital TV 200 (S12). This feature information includes the processing capacity for displaying video and outputting sound, acceptable data types for video and audio, and so on.

The reason why the feature information of other equippments is received in advance is to judge on whether the data streams reproduced from the DVD 1 can be normally presented in the digital TV 200 before actual playback of the DVD 1.

If the microcomputer 13 of the DVD player 100 transmits a command requesting feature information to the microcomputer 22 of the digital TV 200 connected through the IEEE 1394 interface units 15 and 21, the microcomputer 22 of the digital TV 200 retrieves the feature information from the memory 29, that is, the device descriptor information in which all information on system specification, characteristics of acceptable video and audio data, and so on are written, and transmits the retrieved feature information to the microcomputer 13 of the DVD player 10. The device descriptor information of the digital TV 200 is stored in the memory 16 or an internal memory of the microcomputer 13.

In the condition that the device descriptor information of other equippments are stored in the memory 16 or an internal memory of the microprocessor 13, when a key command requesting a playback of a DVD title is entered (S13) through the key entering means 50, the microcomputer 13 reads the device descriptor information of the digital TV 200 which is already stored in the memory 16, compares it with the characteristics of data of the requested title, and then judges on (S14) whether the video and audio data streams to be reproduced and transmitted will be presented into normal video pictures and sounds in the digital TV 200 based on the comparison result.

For example, if the video data of the DVD title to be reproduced are super high-quality pictures of '1280×1080' pixels corresponding to a HD-TV (High Definition-TV) and the device descriptor information indicates that the resolution of the digital TV 200 is '704×408', the microcomputer 13 concludes that the super high-quality video data to be transmitted to the digital TV 200 can not be normally presented in the digital TV 200, so that it transmits an advisory message (S17) informing that the reproduced data can not be normally displayed, instead.

If a viewer requests a detailed information for the message, the microcomputer 13 retrieves (S19) information on the displaying capacity in the device descriptor information stored in the memory 16, and transmits (S20) the retrieved detailed information and the characteristics of video data of the playback-requested DVD title to be displayed onto a screen of the digital TV 200.

If the video data to be reproduced are high-quality pictures of '704×408' pixels suitable to the resolution of the digital TV 200, the microcomputer 13 concludes that the video data to be transmitted to the digital TV 200 are normally presented, so that it performs (S15) the requested playback operation, then transmits (S16) the reproduced video/audio data streams to the digital TV 200 through the IEEE 1394 interface unit 15.

Figure 4:
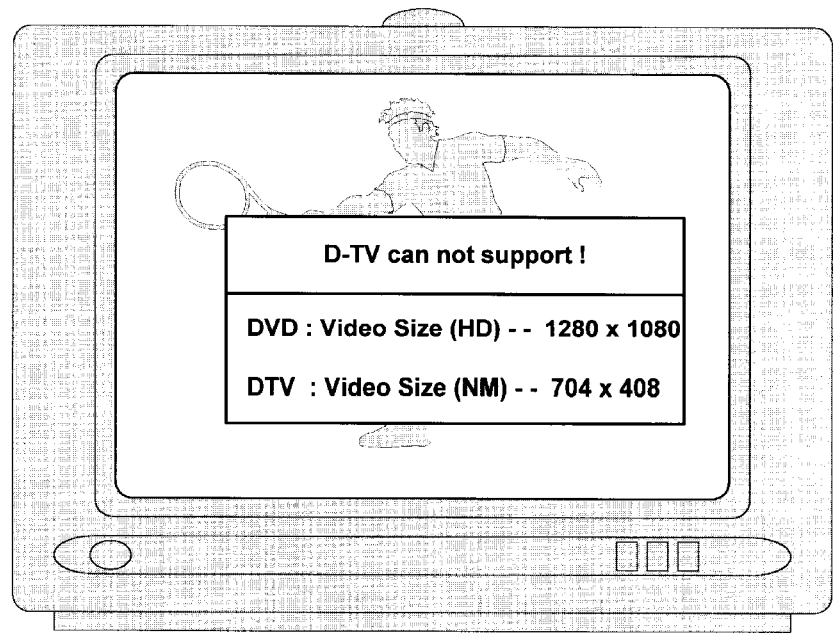
FIG. 4 shows an example of an advisory message informing the characteristics of transmitting data which are offered to the other equipment according to the present invention.

FIG. 4 shows an example of a screen displaying the advisory message and the detailed information which may be provided at the same time by the DVD player 100 without the request of the detailed information.

As described above, when a power source of the DVD player 100 is turned on or a reset is occurred on a digital interface bus, the feature information of the digital TV 200 is received and stored after requesting it to the digital TV 200. Referring to this feature information of the digital TV 200, the DVD player 100 is able to prevent data streams to be reproduced and transmitted from being presented abnormally.

Figure 5:
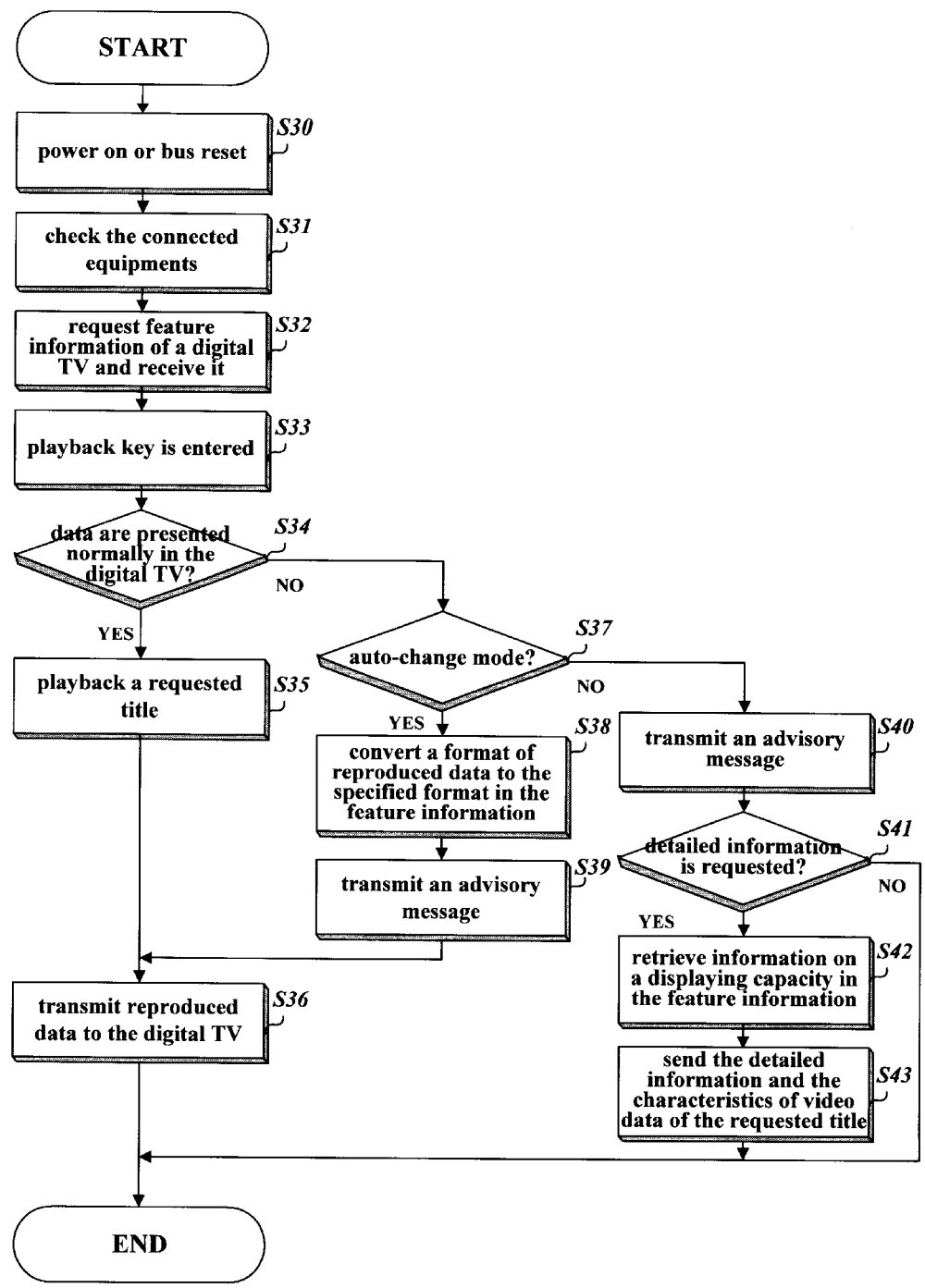

FIG. 5 is a playback flow diagram of the DVD player 100 which another feature-dependent operating method according to the present invention is applied to.

When a power is applied to the DVD player 100 or a reset is occurred (S30) on a digital interface bus, the microcomputer 13 checks (S31) the connection status of the connected equippments including the digital TV 200. If the digital TV 200 is connected through the IEEE 1394 interface, the DVD player 100 requests the device descriptor information to the digital TV 200, receives it from the digital TV (S32), and then stores it in the memory 16 or an internal memory.

Then, if a key command requesting playback of a DVD title is entered (S33) through the key entering means 50, the microcomputer 13 reads the stored device descriptor information of the digital TV 200, compares it with the characteristics of data of the requested title, and then judges on (S34) whether the video and/or audio data streams to be reproduced and transmitted will be normally presented in the digital TV 200, based on the comparison result.

Figure 6:
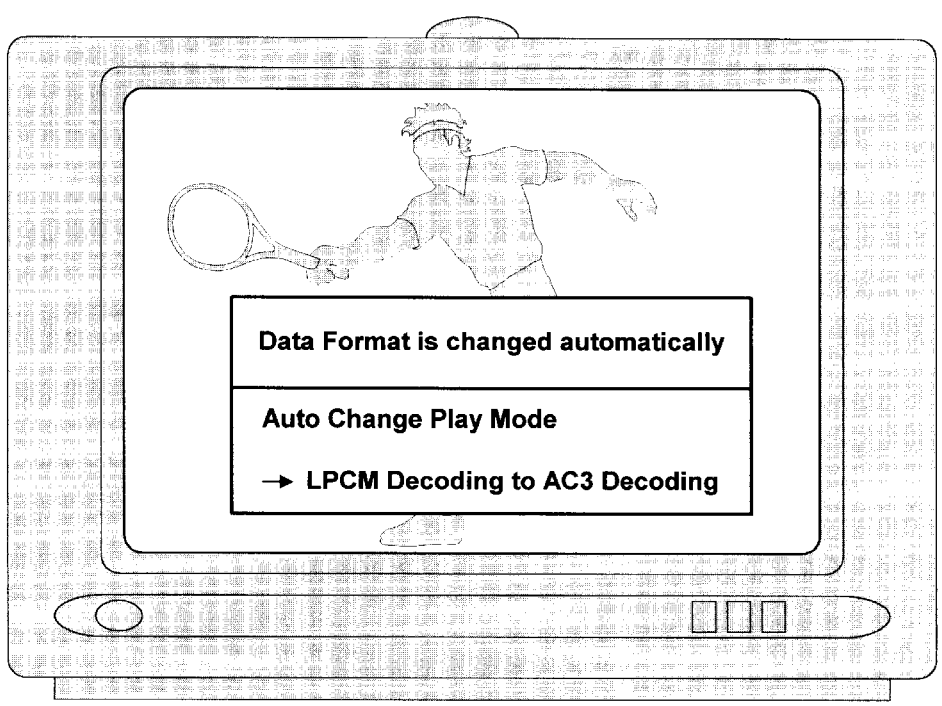
FIG. 6 shows an example of an advisory message displaying information on data format according to the present invention.

For example, if the audio data of the DVD title to be reproduced and transmitted are multi-channel LPCM (Liner Pulse Code Modulation) data and the device descriptor information indicates that the digital TV 200 can accept AC3-formatted audio data, the microcomputer 13 checks whether a present play mode is the auto-change mode (S37). If the present play mode is an auto change mode, the microcomputer 13 converts (S38) the reproduced LPCM audio data into audio data of AC3 format specified in the device descriptor information, and transmits the AC3-formatted data. In addition, it transmits (S39) an advisory message informing that the format of the transmitted data is converted automatically, so that an advisory message shown in FIG. 6 is displayed onto a screen of the digital TV 200.

If the present play mode is not an auto change mode, other advisory message informing of data type mismatch is transmitted (S40) because the LPCM-formatted audio data may not be processed normally in the digital TV 200. Then, if a user requests (S41) a detailed information for the advisory message, the microcomputer 13 retrieves (S42) information on the audio decoding method specified in the device descriptor information stored in the memory 16, and transmits (S43) the retrieved detailed information and the characteristics of audio data of the playback-requested DVD title to be displayed onto a screen of the digital TV 200.

If the format of the audio data to be reproduced is AC3 which is decodable format in the digital TV 200, the microcomputer 13 concludes that the audio data to be transmitted are normally decoded into sounds in the digital TV 200, so that it performs (S35) the requested playback operation, then transmits (S36) the reproduced video/audio data streams to the digital TV 200 through the IEEE 1394 interface unit 15.

According to the above-explained embodiments, data streams to be reproduced and transmitted are prevented from being presented abnormally in the digital TV 200.

The embodiments explained till now are for the case that the requested feature information is received, however the requested feature information can not be received due to various problems.

The flow chart of FIG. 7 which is for the case that the feature information is not received will now be described.

Figure 7:
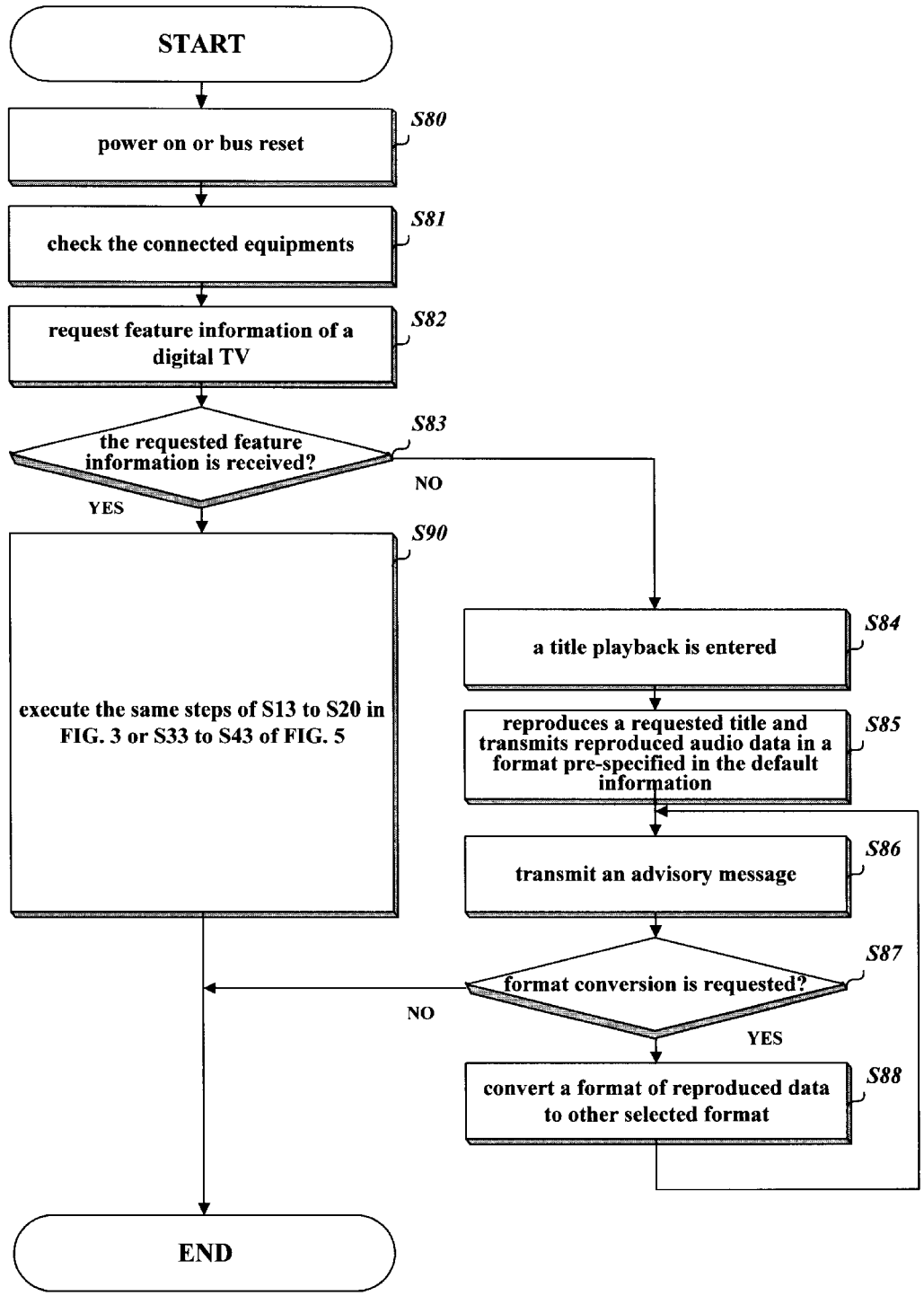

The embodiment of FIG. 7 is for audio data, however, it will be equally applied for video data without departing from essential characteristics thereof. For explaining the flow diagram of FIG. 7, it is supposed that the digital TV 200 is a low-price model manufactured only for presenting high-quality video and audio, so that it has not its own feature information on its capacity for data processing and displaying, or it does not equip the function of exchanging feature information with other equipments.

On this assumption, feature information of the connected equippments is requested at the initial stage of a equipment or an interface bus (S80~S82). This process is same as described above.

After requesting the feature information, the microcomputer 13 checks (S83) whether the requested feature information is received from each equipment. If the feature information was received from the digital TV 200, the microcomputer 12 would execute the same steps of S13 to S20 in FIG. 3 or S33 to S43 of FIG. 5 (S90). However, since the feature information of the digital TV 200 is not received, the microcomputer 13 memorizes the fact that the feature information of the digital TV 200 is not acquired.

Figure 8:
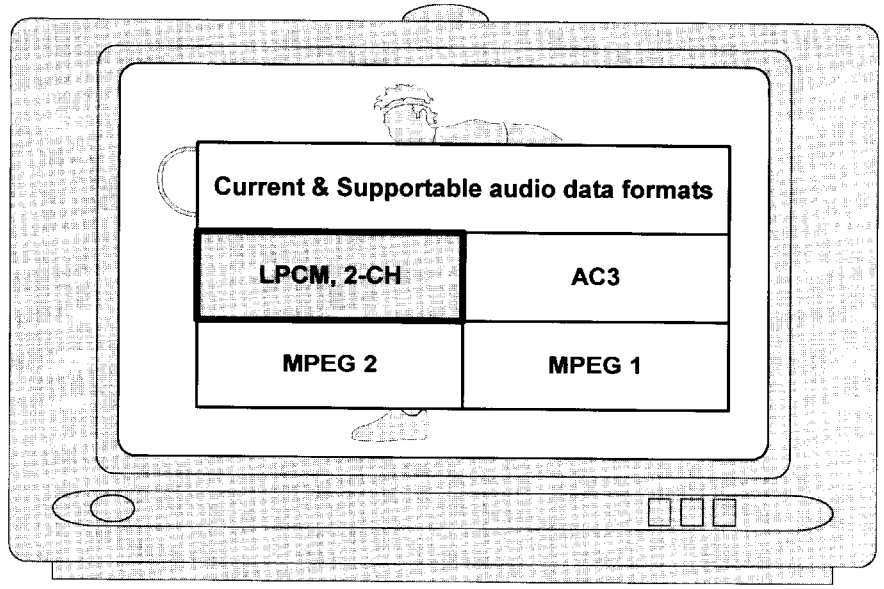
FIG. 8 shows an example of an advisory message informing the format of transmitting data which are offered to the other equipment according to the present invention.

Then, if a playback is requested (S84) from a viewer, the DVD player 100 reads default information designating a processing method for the case of no feature information before playback, and reproduces a requested DVD title and transmits reproduced audio data (S85) in a pre-specified format of the default information which is low-grade or lowermost format applicable to the type of a digital TV, for example, 2-channel LPCM format. At this time, the microcomputer 13 sends (S86) an advisory message telling that the format of audio data transmitted to the digital TV is 2-channel LPCM. FIG. 8 is an example of the advisory message displayed onto the digital TV 200. This advisory message includes all supportable audio formats besides current format of the transmitted audio data. The advisory message may be also displayed on an LCD display panel integrated in the DVD player 100.

Accordingly, a viewer can distinguish the format of the audio data transmitted from the DVD player 100 easily based on the advisory message displayed on the digital TV 200. Thus, if sounds are not outputted normally because of the mismatch between acceptable format of the digital TV and a format specified in the default information stored in the memory 16, a viewer sees the formats supportable in the DVD player 100 from the displayed advisory message, selects one format acceptable to the digital TV 200 among the displayed supportable several formats, and requests the DVD player 100 (S87) to convert the reproduced audio data into the data of the selected format.

For example, a viewer selects the format AC3, MPEG 1 layer 2, or MPEG 1 layer 3 to convert the LPCM audio data after seeing the advisory message shown in FIG. 8. Accordingly, format-converted audio data acceptable to the digital TV 200 are transmitted (S88) from the DVD player 100, so that the audio data are presented in normal sounds by the digital TV 200.

Figure 9:
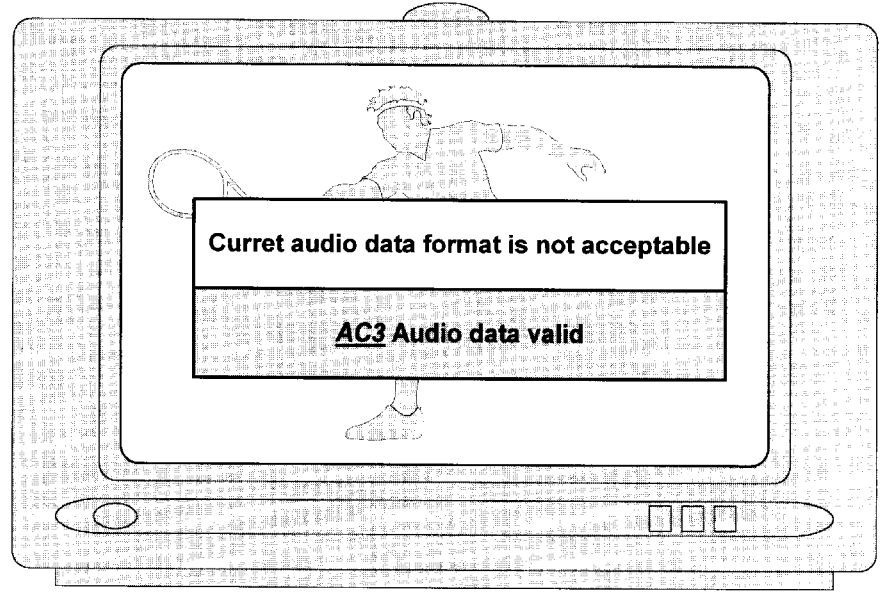
FIG. 9 shows an example of an advisory message informing that the received data cannot be processed in a digital TV.

Meanwhile if the digital TV 200 detects that it can not process the audio data transmitted from the DVD player 100, it may display an error message informing that input audio data are not able to be processed and which format is supportable onto a screen as shown in FIG. 9. In this case, a viewer examines whether the audio data transmitted from the DVD player 100 are normally outputted as changing decoding format among supportable formats of the digital TV 200, and if sounds are normally outputted, the format set at that time is fixed to process input audio data.

The DVD player 100 may be connected with various digital appliances through the digital interface. If reproduced audio data are destined to a digital audio equipment which cannot present video pictures, the DVD player 100 may provide a voice message informing the contents shown in FIG. 8. Also, in the case that the feature information of an audio equipment is not received, the reproduced audio data are provided for the audio equipment in the audio format pre-designated in the default information the same as in the above-mentioned method for the digital TV 200.

The feature-dependent operating method between mutually-connected equippments and the apparatus for controlling the operating method adjust functions and processing capacity of an equipment to the maximal or universal capacity of the connected equipment automatically, or inform a viewer of the cause of possible malfunction if the features of the connected equipment are not same, when data by a requested operation are to be transmitted to the connected equipment, thereby improving the convenience of a viewer.

Although the preferred embodiment of the present invention have been disclosed or illustrative purposes, those skilled in the art will appreciate that various modifications, additions and substitutions are possible, without departing from the scope and spirit of the invention as recited in the accompanying claims.

What is claimed is:

1. A feature-dependent operating method between mutually-connected equipments through a digital interface, comprising the steps of:
   (a) requesting feature information of a connected equipment through the digital interface;
   (b) receiving the requested feature information through the digital interface and storing the received feature information; and
   (c) performing a requested operation or not based on the stored feature information.

2. A method set forth in claim 1, wherein said step (c) comprises the steps of:
   (c1) judging on whether the data to be reproduced and transmitted are normally presented in the connected equipment based on the stored feature information; and
   (c2) performing the requested operation based on the judgement, or transmitting a message informing a result of the judgement.

3. A method set forth in claim 2, wherein the message is about the format of the data to be transmitted.

4. A method set forth in claim 1, wherein the feature information is descriptor information including a system specification of a digital displaying equipment and characteristic information of video and audio data acceptable to the digital displaying equipment.

5. A method set forth in claim 4, wherein the system specification includes information on the resolution of the digital displaying equipment.

6. A method set forth in claim 4, wherein the characteristic information includes information on data format which is acceptable to the digital displaying equipment.

7. A feature-dependent operating method between mutually-connected equipments through a digital interface, comprising the steps of:
   (a) requesting feature information of a connected equipment through the digital interface;
   (b) receiving the requested feature information through the digital interface and storing the received feature information; and
   (c) converting the format of data to be offered to the connected equipment by a requested operation based on the stored feature information, and transmitting the format-converted data.

8. A method set forth in claim 7, wherein said step (c) comprises the steps of:
   (c1) judging on whether the data to be reproduced and transmitted are normally presented in the connected equipment based on the stored feature information; and
   (c2) converting the format of the data into a format which is acceptable to the connected equipment based on the judgement, and transmitting the format-converted data.

9. A method set forth in claim 8, wherein said step (c2) further transmits a message informing that data format is converted.

10. An apparatus for controlling an operation between mutually-connected equippments through a digital interface, comprising:
    a connecting means sending and receiving data through the digital interface;
    a storing means storing feature information of a connected equipment received through said connecting means;
    a data acquisition means obtaining video and/or audio data from a data storage medium;
    a controlling means controlling said data acquisition means to or not to obtain data from the data storage medium based on the stored feature information; and
    a transmitting means transmitting data obtained by said data acquisition means to the connected equipment through the digital interface.

11. An apparatus set forth in claim 10, wherein said controlling means judges on whether the data to be obtained and transmitted are normally presented in the connected equipment based on the stored feature information, and performs a requested operation or not based on the judgement.

12. An apparatus set forth in claim 10, wherein said controlling means judges on whether the data to be obtained and transmitted are normally presented in the connected equipment based on the stored feature information, and transmits a message informing a result of the judgement without performing a requested operation.

13. An apparatus set forth in claim 10, wherein said controlling means judges on whether the data to be obtained and transmitted are normally presented in the connected equipment based on the stored feature information, changes the format of the data based on the stored feature information, and transmits the format-changed data.

14. A method for providing data between mutually-connected equippments through a digital interface, comprising the steps of:
    (a) requesting feature information of a connected equipment through the digital interface;
    (b) checking whether the requested feature information is received or not; and
    (c) transmitting the data to be offered according to a requested operation to the connected equipment in a format pre-specified for the connected equipment if the requested feature information is not received.

15. A method set forth in claim 14, wherein the connected equipment is a video displaying equipment or an audio equipment which can accept digital data.

16. A method set forth in claim 14, wherein the pre-specified format is 2-channel LPCM.

17. A method set forth in claim 14, wherein said step (c) transmits data together with a message informing the format of the transmitted data.

18. A method set forth in claim 14, further comprising the step of converting the format of the data to be offered into a format specified by an external request.

19. A method set forth in claim 14, wherein the pre-specified format is low-grade one applicable to the type of the connected equipment.

* * * * *